United States Patent [19]
Jones et al.

[11] Patent Number: 5,711,872
[45] Date of Patent: Jan. 27, 1998

[54] REUSABLE OIL FILTER ASSEMBLY

[76] Inventors: John A. Jones, 2246 Eagle Dr., La Verne, Calif. 91750; Robert Kanovitz, 6433 Topanga Canyon Rd., Suite 133, Canoga Park, Calif. 91303

[21] Appl. No.: 489,523

[22] Filed: Jun. 12, 1995

Related U.S. Application Data

[63] Continuation-in-part of Ser. No. 260,972, Jun. 15, 1994, abandoned.

[51] Int. Cl.$^6$ .................. B01D 35/147; B01D 35/153
[52] U.S. Cl. .................. 210/130; 210/136; 210/232; 210/443; 210/450; 210/453
[58] Field of Search .................. 210/130, 136, 210/232, 440, 450, 456, 487, 499, 493.1, 493.2, 493.5, DIG. 17, 186, 238, 443, 444, 453

[56] References Cited

U.S. PATENT DOCUMENTS

| | | | |
|---|---|---|---|
| 2,358,933 | 9/1944 | Lance | 210/186 |
| 2,633,146 | 3/1953 | Wittt | 210/443 |
| 3,473,666 | 10/1969 | Humbert, Jr. | 210/443 |
| 3,807,561 | 4/1974 | Cullis | 210/130 |
| 4,622,136 | 11/1986 | Karcey | 210/168 |
| 4,717,472 | 1/1988 | Oberg | 210/90 |
| 5,066,391 | 11/1991 | Faria | 210/85 |
| 5,548,893 | 8/1996 | Koelfgen | 210/130 |

FOREIGN PATENT DOCUMENTS 1477450  5/1989  U.S.S.R.

*Primary Examiner*—Matthew O. Savage
*Attorney, Agent, or Firm*—Robbins, Berliner & Carson, LLP

[57] ABSTRACT

A reusable oil filter assembly adapted for use in filtering the lubricating oil of an engine configured to receive an oil filter, including a filter housing having an open end and a closed end, a filter mount disposed between the filter housing and the engine for receiving the unfiltered oil from the engine and returning filtered oil to the engine. The filter mount includes a first plate, a second plate, and an anti-drain back seal disposed between the first plate and the second plate. The anti-drain back seal prevents both the oil disposed in the engine from flowing out into the filter assembly and the oil disposed in the filter assembly from flowing into the engine when the engine is turned off. The first plate, the second plate and the anti-drain back seal are fittingly, rather than integrally, mated together, thus facilitating service, repair and replacement of the assembly. A reusable filter cartridge registers with the filter mount inside the chamber to receive from the engine unfiltered oil from regions exterior of the cartridge and to return to the engine filtered oil from regions interior of the cartridge.

14 Claims, 15 Drawing Sheets

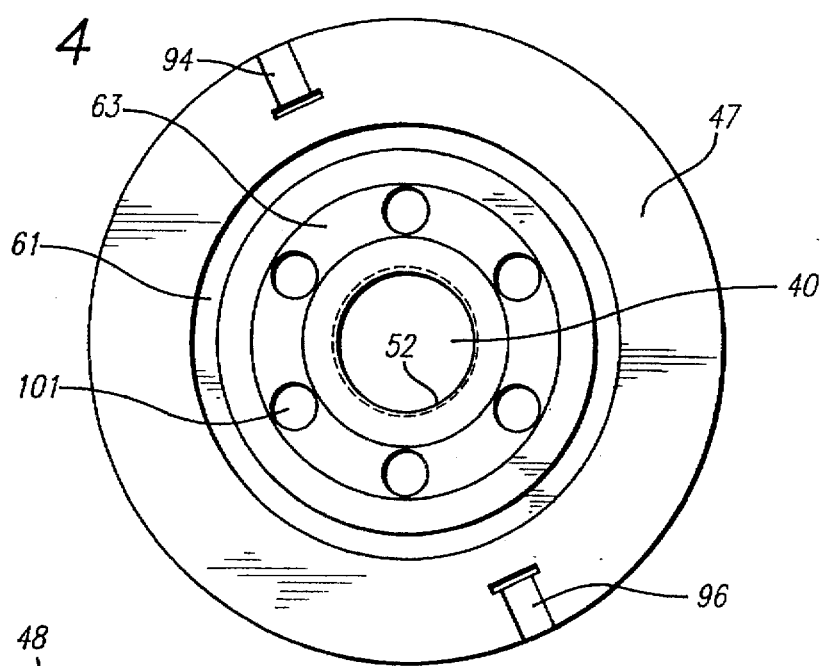
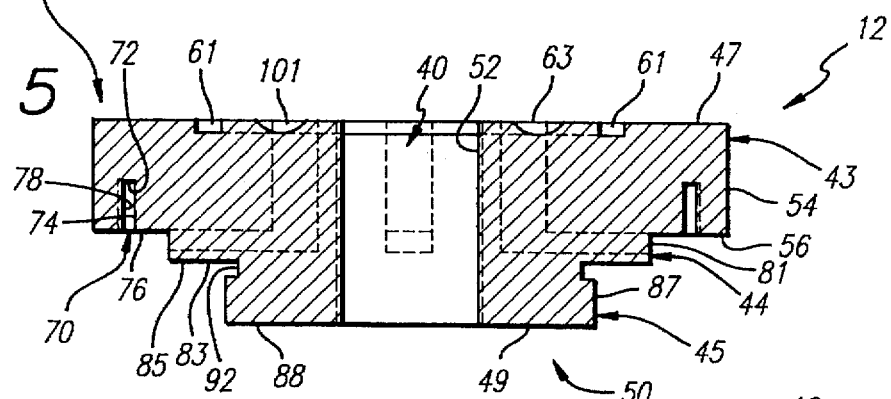
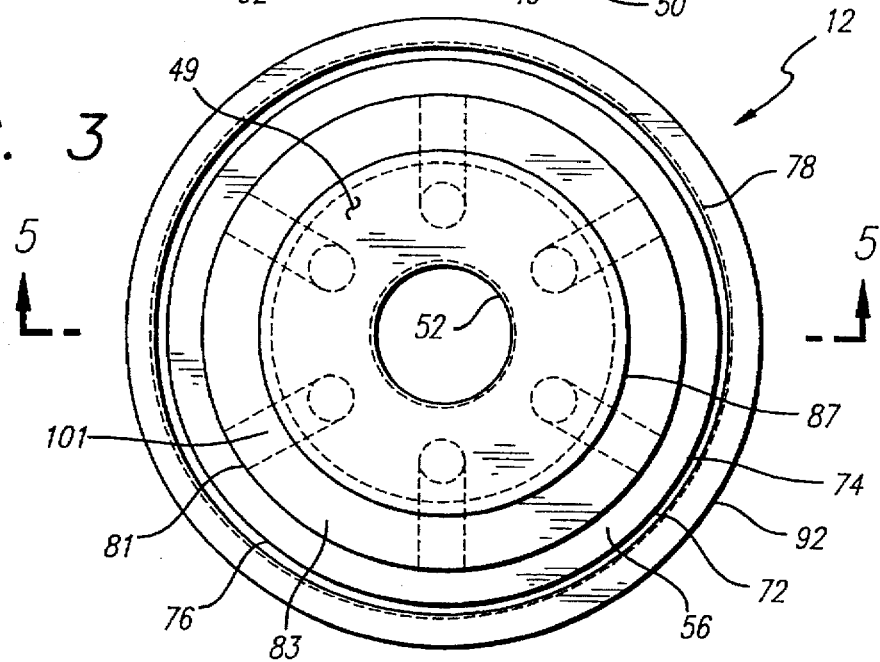

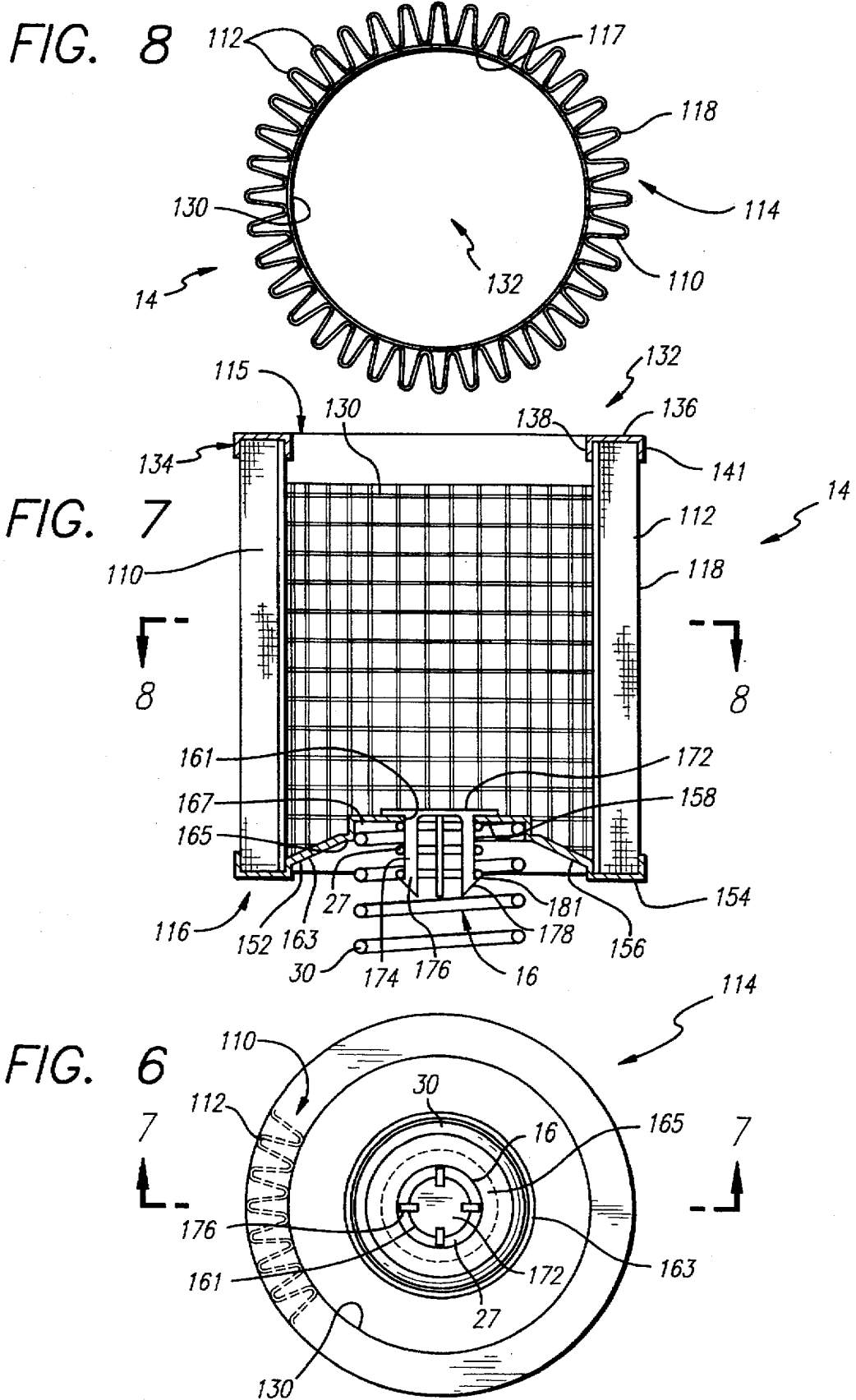

REUSABLE OIL FILTER ASSEMBLY

CROSS-REFERENCE TO RELATED APPLICATION

This is a continuation-in-part of U.S. patent application Ser. No. 08/260,972, filed Jun. 15, 1994, now abandoned.

BACKGROUND OF THE INVENTION

1. Field of the Invention

The present invention relates generally to oil filters for engines, and more specifically to reusable assemblies adapted for use in filtering the lubricating oil of engines.

2. Description of the Prior Art

It has long been desirable to provide an easily maintainable and serviceable reusable oil filter which also provides increased oil flow while minimizing the friction created by the oil flow, thereby minimizing the heat in the oil. Typical reusable oil filter devices known to Applicant are exemplified by U.S. Pat. Nos. 5,066,391; 4,717,472; and 4,622,136. Reusable oil filters utilized in the prior art exemplified by the above-identified patents have generally been unsatisfactory. Some of the difficulties which have been encountered are that the devices (1) are not well adapted for cleaning, service, repair and/or replacement, (2) include adapters which are not suitable for coupling a single filter assembly to a wide variety of engines, (3) limit the flow of oil through the filter, (4) fail to minimize the friction created by the flow of oil through the channels, thereby resulting in increased heat in the oil, (5) do not have an anti-drain back seal, and (6) can easily be damaged from debris which bounce off the road.

In particular, reusable filter cartridges of the past have not been particularly well adapted for cleaning. Even where such cartridges have been formed from metal or metal wire cloth, the interior radius of the cartridge has been relatively small making it difficult to insert a brush or other implement for cleaning the interior region of the cartridge. Where the material forming the filter element has been provided in a pleated configuration, the pleats have been relatively deep and sharply creased thereby adding to the difficulty of the cleaning process. Also, there has been no attempt to orient the metal or metal wire cloth associated with the filter element in a direction whereby the warp and chute wires are disposed in an attitude which facilitates cleaning the cartridge.

Additionally, reusable filter cartridges of the past have not been particularly well adapted for service, repair and/or replacement. Typical reusable oil filters, such as that disclosed in U.S. Pat. No. 5,066,391 to Faria, require that the oil be drained from the engine block before the filter cartridge and relief valve may be inspected and serviced. Furthermore, typical reusable oil filters do not have anti-drain back seals and thus cannot be used on engines which require the oil filter to be placed above or lateral to the engine block as oil must be maintained within the filter housing so a vacuum will not be created with the emptying of the oil back into the engine block when the engine is turned off. The oil must be maintained within the filter housing so a vacuum will not be created with the emptying of the oil back into the engine block, thereby making it particularly difficult to inspect or service the filter.

Furthermore, prior art reusable oil filters include adapters which are not suitable for coupling a single filter assembly to a wide variety of engines. It is well-known that the filter base and the associated filter which screws onto the engine block will vary significantly in size and disposition for different engines and automobiles. In any contemplation for a retrofit product, such as a reusable oil filter, it is desirable to provide an adapter which will accommodate the filter assembly on a variety of different engines. Adapters of the prior art, such as those exemplified by the above-identified patents, have not been suitable for coupling a single filter assembly to a wide variety of engines.

Additionally, some conventional reusable oil filters suffer from insufficient oil flow. Those filters which provide sufficient oil flow suffer from attendant disadvantages such as increased friction created by the flow of oil through the filter cartridges, thereby resulting in increased heat in the oil.

What is needed therefore is an easily maintainable and serviceable reusable oil filter which also provides increased oil flow while minimizing the friction created by the oil flow, thereby minimizing the heat in the oil.

SUMMARY OF THE INVENTION

The preceding and other shortcomings of the prior art are addressed and overcome by the present invention which provides a reusable filter assembly including a filter mount which includes an anti-drain back seal, housing, and cleanable, reusable filter cartridge. A relief valve is provided as a permanent part of the filter cartridge and is accessible for testing from regions exterior of the cartridge.

Cleaning of the cartridge is facilitated by a large central channel and a filter element with pleats having a radial dimension which is in a range of ⅕ to ⅓ the radius of the filter cartridge. A universal adapter is provided which makes the reusable filter assembly adaptable for use with a wide variety of engine configurations.

A compression spring associated with the relief valve can be chosen to provide a particular bypass pressure. This spring is easily mounted to the filter cartridge from regions exterior of the filter cartridge making it simple to adapt the assembly to different relief pressure requirements.

The filter element is formed from a preferred weave of metal wire cloth referred to as a duplex plain dutch weave. This material is available in a 45 micron wire cloth the cleaning of which is greatly facilitated by orienting the twin warp wires to extend circumferentially of the cartridge while the shute wires extend axially of the cartridge. With this orientation, the interstices between the shute elements are easily cleaned by an axial motion along the pleats of the filter element using a brush or other implement, as well as allowing for an equalization of oil pressure as unfiltered oil passes from the exterior of the metal wire cloth through the wire metal cloth and into the central passage, returning filtered oil back into the engine through the inlet passage.

The foregoing and additional features and advantages of this invention will become apparent from the detailed description and accompanying drawing figures that follow. In the figures and written description, numerals indicate the various features of the invention, like numerals referring to like features throughout for both the drawing figures and the written description.

BRIEF DESCRIPTION OF THE DRAWINGS

FIG. 3 is a plan view of a filter side of the adapter associated with the present invention;

FIG. 4 is a plan view of an engine side of the adapter associated with the present invention;

FIG. 5 is a cross-section view of the adapter taken along lines 5—5 of FIG. 3;

FIG. 6 is a bottom plan view of the filter cartridge associated with the present invention;

FIG. 7 is a cross-section view of the filter cartridge taken along lines 7—7 of FIG. 6;

FIG. 7A is a plan view of a wire weave which forms a filter cloth in a preferred embodiment of the invention;

FIG. 8 is a cross-section view of the filter cartridge taken along lines 8—8 of FIG. 7;

DETAILED DESCRIPTION OF THE PREFERRED EMBODIMENTS

Figure 1:
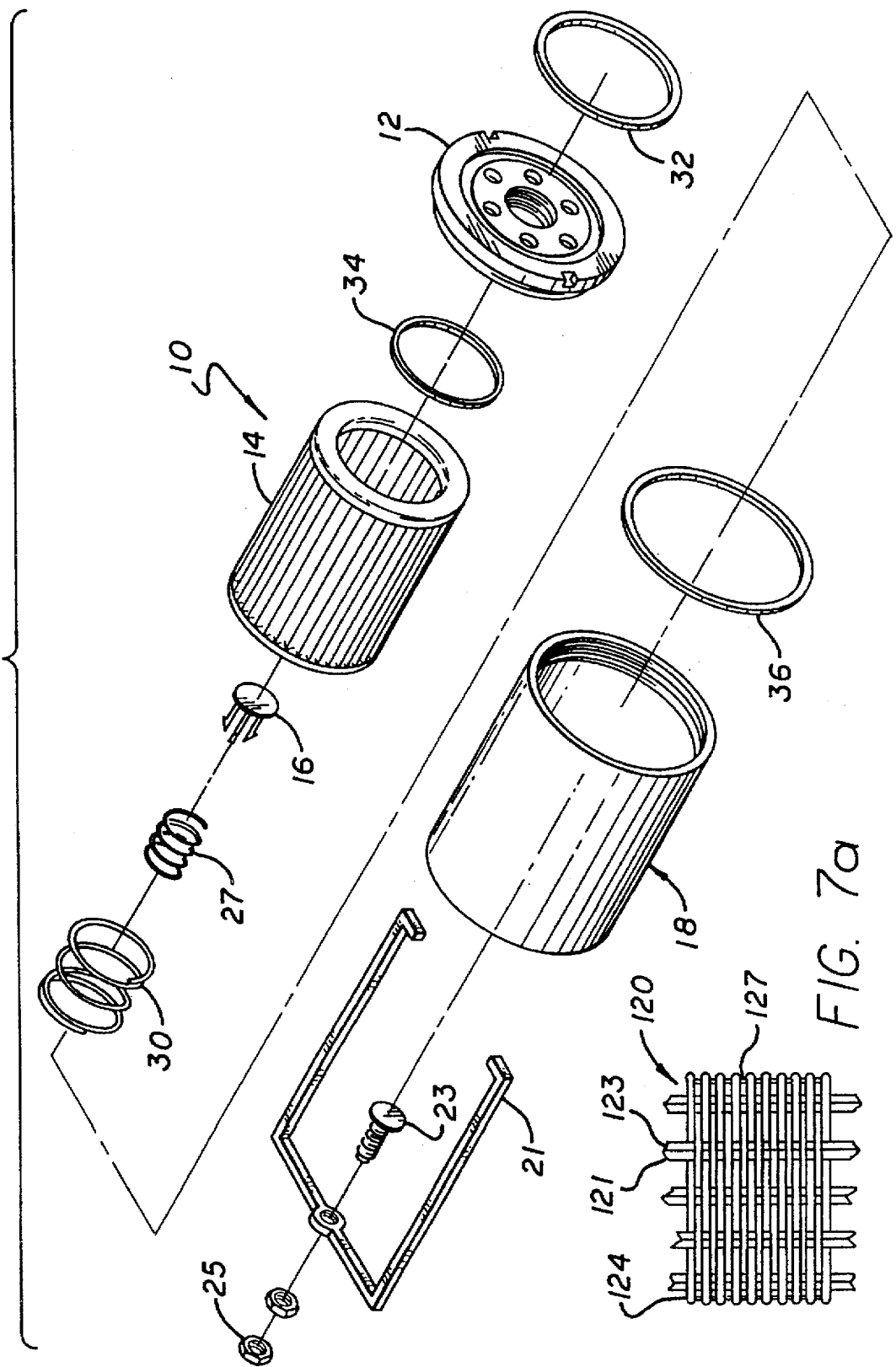
FIG. 1 is an expanded perspective view of one embodiment of the reusable filter assembly including an adapter, a filter cartridge and a housing in accordance with the present invention.

A reusable filter assembly is illustrated in the expanded view of FIG. 1 and designated by the reference numeral 10. This assembly 10 is particularly adapted to be retrofit to an automobile engine in place of presently disposable filters for lubricating oil. The filter assembly 10 is constructed for ease of cleaning, so that it can be used repeatedly without the additional expense associated with disposable filters.

The filter assembly includes an adapter 12, a filter cartridge 14 with associated relief valve 16, and a housing 18 with associated bale 21. The bale 21 includes a set screw 23 and lock nut 25 which are described in greater detail below. A compression spring 27 controls the bypass pressure of the relief valve 16; while a spring 30, disposed between the housing 18 and the filter cartridge 14, facilitates a sealing relationship between the adapter 12 and the cartridge 14.

Also illustrated in the embodiment of FIG. 1 are gaskets 32, 34, and 36. The gasket 32 maintains the adapter 12 and the engine in sealing relationship, while the gasket 34 is disposed between the cartridge 14 and the adapter 12 also creating a sealing relationship. The gasket 36 is disposed to form a seal between the housing 18 and the adapter 12.

Figure 2:
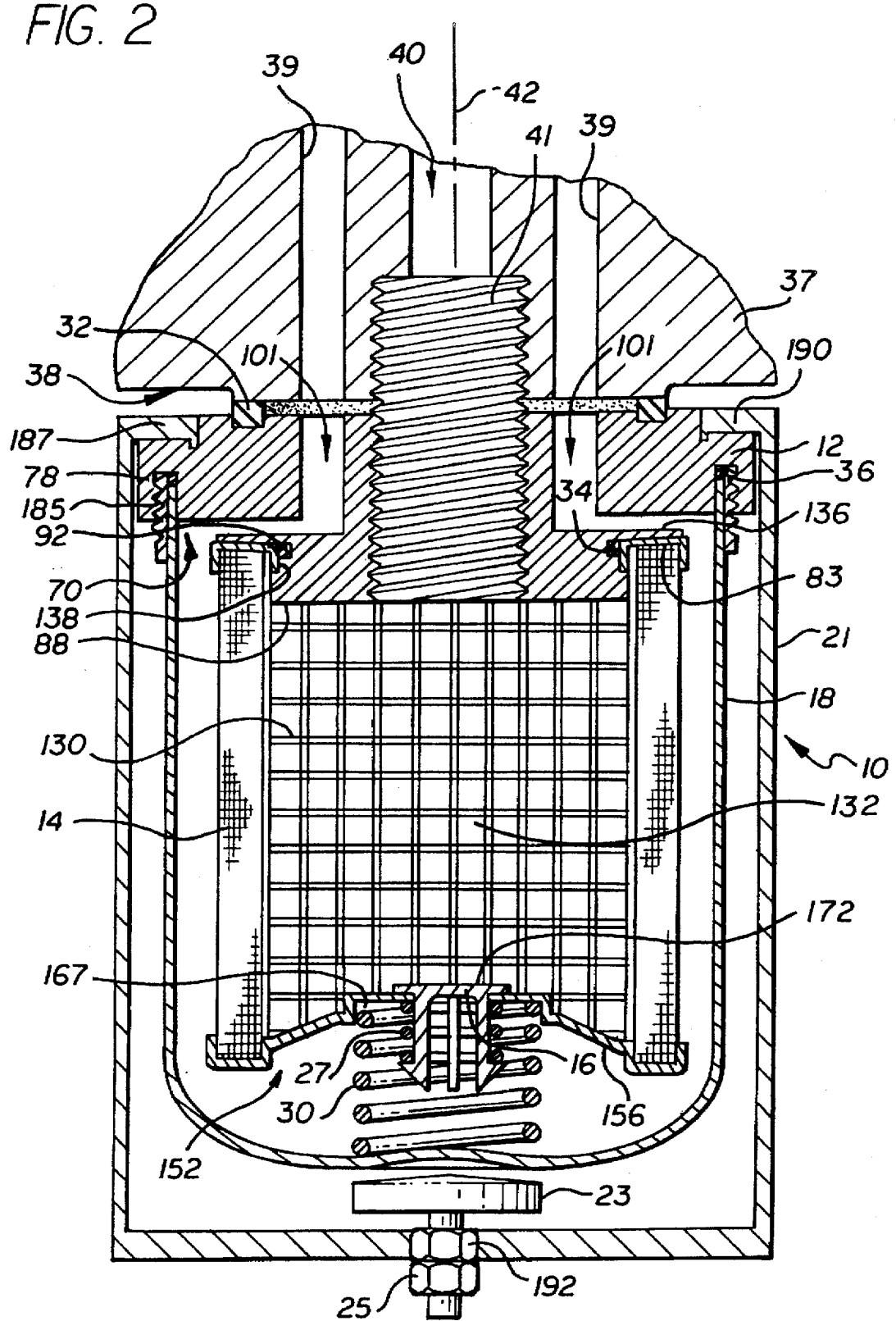
FIG. 2 is an axial cross-section view of the filter assembly fully assembled and attached to the block of an engine.

When fully assembled, the reusable filter assembly is adapted for disposition on an engine block 37 having a filter base 38 best illustrated in FIG. 2. The engine block 37 includes outlet passages 39 through which unfiltered oil passes to the filter assembly 10. The engine block 37 also includes an inlet passage 40 which receives filtered oil from the assembly 10. The inlet passage 40 typically consists of a hollow threaded post 41 which extends outwardly of the engine block 37 to engage the filter assembly 10.

The adapter 12 is shown in greater detail in FIGS. 2–5. This adapter 12 in the illustrated embodiment is constructed along an axis 42 and formed as a series of integral concentric cylinders 43, 44 and 45 which are disposed in end-to-end relationship between a radial surface 47 on an engine facing side 48 of the adapter 12 and a radial surface 49 on a filter side 50 of the adapter 12.

The first cylinder 43, which has an inside diameter 52 and an outside diameter 54, extends from the radial surface 47 to a radial surface 56. An annular groove 61 can be formed in the radial surface 47 to receive the gasket 32. A second annular groove 63 is disposed inwardly of, and concentric with, the annular groove 61. This second annular groove 63 is positioned to mate universally with the outlet passages 39 associated with the filter base 38 of the engine block 37. Thus the unfiltered oil in the outlet passages 39 first touches the filter assembly 10 at the annular groove 63. The inside diameter 52 of the first cylinder 43 is threaded to mate with the hollow threaded post 41 extending from the engine block 37 at the filter base 38.

An annular recess 70 is also formed in the radial surface 56 on the filter side 50 of the adapter 12. This annular recess 70 has a bottom surface 72 and an inner side surface 74 which forms a first shoulder 76 with the radial surface 56. An outer side surface 78 is threaded to receive the housing 18 with the gasket 36 seated in sealing engagement with the bottom surface 72.

The second cylinder 44 extends axially from the radial surface 56 of the first cylinder 43. This second cylinder 44 has the same inside diameter 52 but extends in a radial direction to an outer surface 81 which has a diameter less than that of the surface 54. In the axial direction, the second cylinder 44 extends from the radial surface 56 to a radial surface 83. Thus the radial surfaces 81 and 83 form a second shoulder 85 of the adapter 12.

The third cylinder 45 extends axially of the second cylinder 44 on the side opposite the first cylinder 43. This third cylinder 45 has the same inside diameter 52 but extends radially outwardly to an axial cylindrical surface 87 which has a diameter less than that of the outer surface 81. In the axial direction, the third cylinder 45 extends from the radial surface 83 to the radial surface 49 which defines most of the filter facing side 50 of the adapter 12. A radial recess 92 is provided in the cylindrical surface 87 of the third cylinder 45 along the radial surface 83 of the second cylinder 44. This radial recess 92 is sized and configured to receive the gasket 34 associated with the filter cartridge 14. A third shoulder 88 is defined by the radial surface 49 and the cylindrical surface 87.

In order to facilitate attachment of the bale 21 to the adapter 12, a pair of circumferential recesses 94, 96 can be formed in the radial surface 47 at diametrically opposed positions. These recesses 94, 96 are best illustrated in FIG. 4.

Of particular importance to the flow of unfiltered oil, are a plurality of inlet passages 101 which, in a preferred embodiment, extend axially from the annular groove 63 and radially outwardly through the second cylinder 44. Thus the unfiltered oil from the outlet passages 39 of the engine block 37 is first introduced to the annular groove 63 and then directed through the multiple inlet passages 101 of the adapter 12. In the passages 101, the oil flows axially and then outwardly to exit the adapter 12 at the outer surface 81.

The reusable filter cartridge 14 is best illustrated in FIGS. 6–8. The filter cartridge 14 is characterized primarily by a filter element 110 which is formed as a multiplicity of pleats 112 in the shape of a cylinder 114 best illustrated in FIG. 8. The pleats 112 are characterized by inner convolutions 117, which define the inside diameter of the filter element 110, and outer convolutions 118, which define the outside diameter of the filter element 110.

The filter element 110 is preferably formed from a metal wire cloth 120 which will typically be woven from stainless steel wires. Any metal wire cloth having a suitable micron filtration characteristic could be used for the filter element 110. In a preferred embodiment, this metal wire cloth is formed from wires which are woven in a duplex plain dutch weave best illustrated in FIG. 7A. This weave includes two small diameter warp wires 121, 123 which are woven with individual alternating shute wires 124. The resulting metal wire cloth 120 can be obtained from Tri Screen Inc. of Claremont, Calif. with filter porosity of 45 microns. This filter wire cloth 120 is oriented in a preferred embodiment of the filter cartridge 14 with the warp wires 121, 123 extending circumferentially of the filter cartridge 14 and the shute wires 124 extending axially of the filter cartridge 14. With this orientation, the shute wires 124 which define elongate passages 127 which extend axially along the pleats 112. This greatly facilitates cleaning the outer surface of the filter cartridge 14 as well as equalizing oil pressure as unfiltered oil passes from the exterior of the filter element 110 through the metal wire cloth 120 into the central passage 132.

A support screen 130 is provided in the illustrated embodiment and positioned inwardly of the inner convolutions 117 associated with the filter element 110. The support screen 130 is provided with a cylindrical configuration and defines a central passage 132 of the filter cartridge 14 generally between the first end 115 and second end 116 of the filter element 110. The support screen 130 in a preferred embodiment is formed from stainless steel wires which are welded together to form quarter-inch square openings in the support screen 130.

At the first end 115 of the filter element 110, a first closure cap 134 is provided to cover the support screen 130 as well as the pleats 112. This first closure cap 134 has a toroidal configuration and includes a central section 136 which extends radially between an inner flange 138 and an outer flange 141. The flanges 138, 141 extend generally axially along the support screen 130 and the outer convolutions 118, respectively. The first closure cap 134 performs two purposes: First, it prevents unfiltered oil on the outside of the filter element 110 from flowing axially along the pleats 112. Second, the first closure cap 134 functions to facilitate disposition of the cartridge 14 onto the adapter 12 in a manner described in greater detail below.

A second closure cap 152 can be provided at the second end 116 of the filter cartridge 14. As opposed to the first closure cap 134 which leaves a large opening into the central passage 132, the second closure cap 152 generally closes this central passage 132 at the second end 116. In a preferred embodiment, the second closure cap 152 includes toroidal portions 154 which close the pleats 112 at the second end 116, but it also includes an end partition 156 which extends across the central passage 132. This end partition 156 includes a central wall 158 which is apertured to form a central hole 161. Between the central hole 161 and the toroidal portions 154, the end partition 156 can be strengthened by the formation of annular shoulders 163 and 165. In the illustrated embodiment, the annular shoulder 165 forms a recess 167 which extends to the central wall 158.

This construction of the end partition 156 also facilitates construction of the relief valve 16, best illustrated in FIGS. 2 and 7. This relief valve 16 includes a disk or septum 172 which is disposed in the central passage 132 which defines the regions interior of the filter cartridge 14. Integral with the septum 172 are a plurality of shafts 174 which extend through the central hole 161 to regions exterior of the filter cartridge 14. At the outermost extension of each of the shafts 174, a barb 176 extends from a point on the associated shaft 174 outwardly along an incline plane 178 to form a shelf 181.

This construction of the relief valve 16 is of particular advantage to the present invention. First, it facilitates easy assembly with the spring 27 which can be slid axially over the barbs 176 to engage the shelf 181 and the outer surface of the central wall 158. This assembly step must be preceded by choice of the proper spring 27 to provide filter bypass at a predetermined pressure. Since this choice is likely to be made by an individual, it is probable that the assembly step which follows will also be performed by the individual. Any simplification of an assembly step will be greatly appreciated during the manufacturing process.

This construction of the relief valve 16 is also important since it enables a user to test the relief valve 16 from regions exterior of the filter cartridge 14. By merely pressing axially against the relief valve 16 against the bias of the spring 27, the septum 172 can be moved from the central wall 158 to test the relief valve 16. Not only does the filter assembly 10 provide access to the relief valve 16, but this construction also facilitates testing of the valve by the user.

A subassembly associated with the filter cartridge 14 may also include the spring 30 which is seated within the recess 167 of the end partition 156. This spring 30 facilitates a proper seal between the filter cartridge 14 and the adapter 12 in a manner described in greater detail below.

Returning now to FIG. 2, one can appreciate the ease of assembly associated with the various elements of the filter assembly 10. Initially the adapter 12 is screwed onto the hollow threaded post 41 to form a seal at the gasket 32 between the engine block 37 and the adapter 12. This aligns the adapter 12 to receive unfiltered oil in the passages 101 and to return filtered oil through the central passage 132 of the adapter 12 and the hollow threaded post 41 of the engine block 37.

With the adapter 12 in place, the filter cartridge 14 can then be mounted with its open first end 115 engaging the third shoulder 88 formed by the surfaces 49 and 87 associated with the third cylinder 45. In this position, the first closure cap 134 seats with its central section 136 in contact with the radial surface 83, and the inner flange 138 forms a seal with the gasket 34 disposed in the radial recess 92.

It is desirable that the filter cartridge 14 be force fit onto the third shoulder 88 so that it can support itself as the housing 18 is brought into position. This force fit can be enhanced by close tolerances between the inner flange 138 and the cylindrical surface 87. Alternatively, the inner flange 138 can be formed to extend slightly radially inwardly as it extends from the central section 136. This configuration forces the third shoulder 88 to bend the inner flange 138 into axial alignment as it is force fit onto the third shoulder 88 of the third cylinder 45.

With the filter cartridge 14 operatively positioned, the housing 18 can then be placed over the filter cartridge 14 and seated against the adapter 12. This seating is facilitated by the gasket 36 which is disposed in the annular recess 70 of the adapter 12. The housing 18 can also be formed with a threaded annulus 185 which facilitates screwing the housing 18 into the threaded outer side surface 78 of the annular recess 70. As the housing 18 is brought into sealing engagement with the adapter 12, the spring 30 is forced by the closed end of the housing 18 to exert a pressure on the closed second end 116 of the filter cartridge 14. This feature maintains the filter cartridge 14 in its preferred position on the third shoulder 88 of the third cylinder 45, and enhances the sealing engagement of the filter cartridge 14 with the adapter 12.

In some embodiments of the filter assembly 10 which are adapted for use with vehicles having a relatively high oil pressure, additional support may be desired in order to maintain the housing 18 in position. In the illustrated embodiment, this support is provided by the bale 21 which can be formed with a pair of radially extending pins 187 and 190 which mate with the circumferential recesses 94 and 96, respectively, of the adapter 12. In this manner, the bale 21 can be held in a pivotal relationship with the adapter 12. At the opposite end of the bale 21, the set screw 23 can be turned within a fixed nut 192, to create an axial force against the housing 18. When the proper force is generated, the lock nut 25 can be tightened to maintain the axial position of the set screw 23.

In operation, unfiltered oil emanates from the outlet passages 39 of the engine block 37 and into the inlet passages 101 associated with the adapter 12. This unfiltered oil passes into the region defined outwardly by the housing 18 and inwardly by the filter cartridge 14. Due to the presence of the closure caps 134 and 152, and the seal provided by the gasket 34, the fluid pressure forces the oil through the pleats 112 of the filter element 110. The filtered oil then passes into the central passage 132 and through the adapter 12 into the hollow threaded post 41 of the engine block 37.

The foregoing construction is of particular advantage to a reusable filter, such as the filter assembly 10. Not only is disassembly easily accomplished, but the various components are easily cleaned for subsequent reassembly. The filter cartridge 14 has a relatively large central passage 132 which facilitates cleaning of the interior surface of the filter element 110. Forming the pleats 112 with a shallow configuration and rounding the convolutions 117 and 118 also facilitate cleaning with a brush or other implement. Even the orientation of the filter wire cloth 120 with the elongate passages 127 extending axially, enhances the cleaning process.

After the filter cartridge 14 is cleaned, the relief valve 16 can be easily tested from regions exterior of the cartridge 14. This testing is facilitated by simple axial pressure against the barbs 176.

After the filter cartridge 14 has been cleaned and the relief valve 16 tested, the filter assembly 10 can be reassembled. When the open end of the cartridge 14 is positioned over the third cylinder 45 of the adapter 12, the desired force fit provided by the inner flange 138 maintains that operative position. Then, without holding the filter cartridge 14, the housing 18 can be screwed into the annular recess 70 of the adapter 12 and the bale 21 can be pivoted into position. Tightening the set screw 23 and the associated lock nut 25 completes the process.

There are many variations on the foregoing concept associated with this invention. Certainly the filter wire cloth 120 can be provided with many different weaves and configurations. Additionally, the construction of the adapter 12 can be altered significantly to provide other forms of a universal adapter 12 on the engine block 37, and to provide for a flow of the unfiltered oil into the housing 18. Other means could also be provided to form the necessary seals between the adapter 12 and each of the filter base 38, housing 18, and filter cartridge 14. Furthermore, the adapter can be replaced by a filter mount for mounting the filter on the engine block 37 and to provide for a flow of the unfiltered oil into the housing 18 as illustrated in FIGS. 9–18 in one embodiment and FIGS. 19–24 in another embodiment.

The structure of the relief valve 16 could also be altered significantly in both its form and its position relative to the filter cartridge 14. Nevertheless, it seems to be of particular advantage to form the relief valve 16 as a permanent part of the filter cartridge 14. A construction which facilitates testing of the relief valve 16 from regions exterior of the filter cartridge 14 is also highly desirable.

Different materials can also be used for various components in the filter assembly 10. For example, any of the components (other than the gaskets 32–36) can be made from metal such as aluminum or steel. In addition the adapter 12, the housing 18, and the relief valve 16 can be made from plastic.

Figure 25:
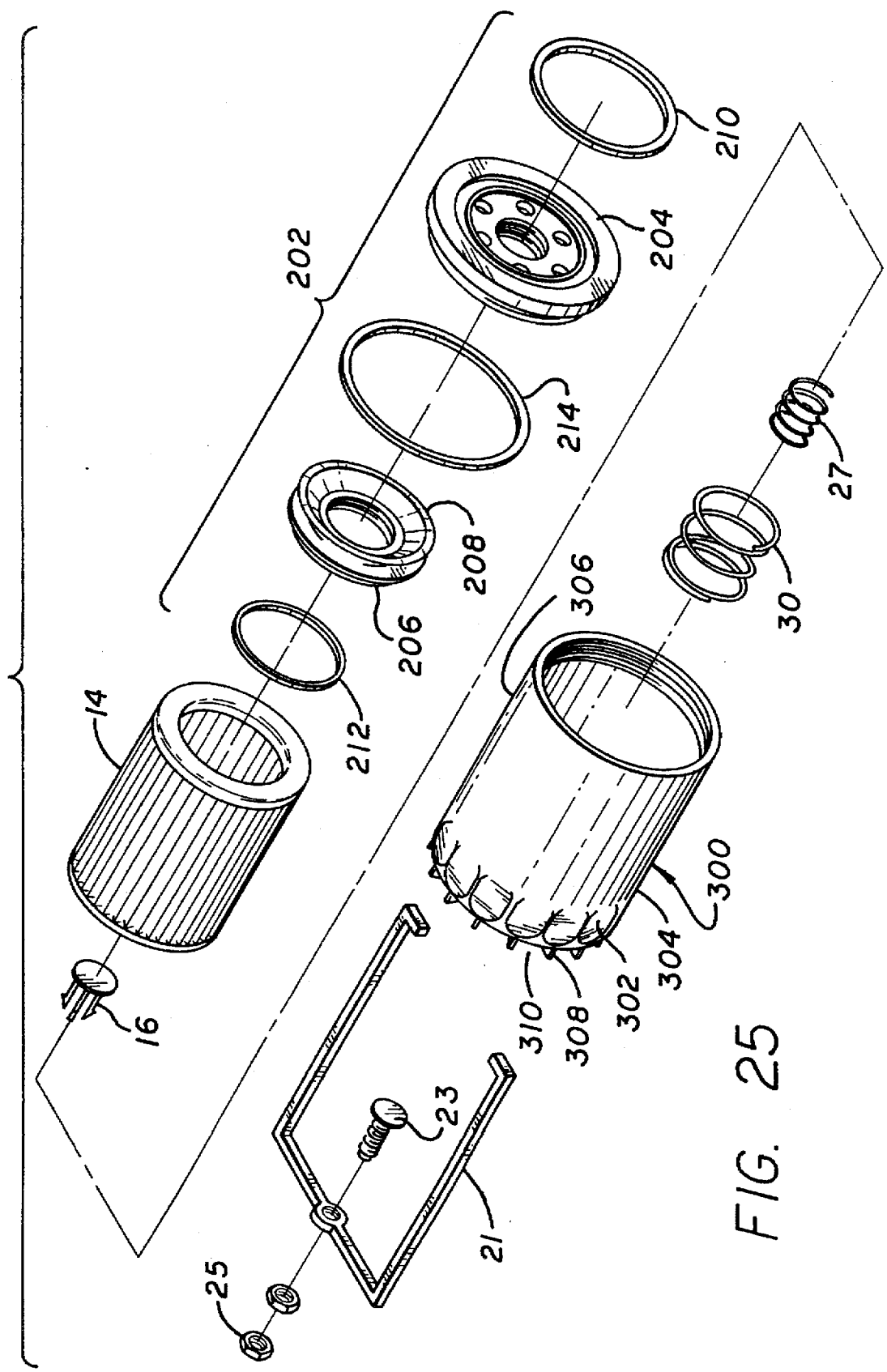
FIG. 25 is an expanded perspective view illustrating another alternative reusable filter assembly including filter mount, filter cartridge and housing in accordance with the present invention.
Figure 26:
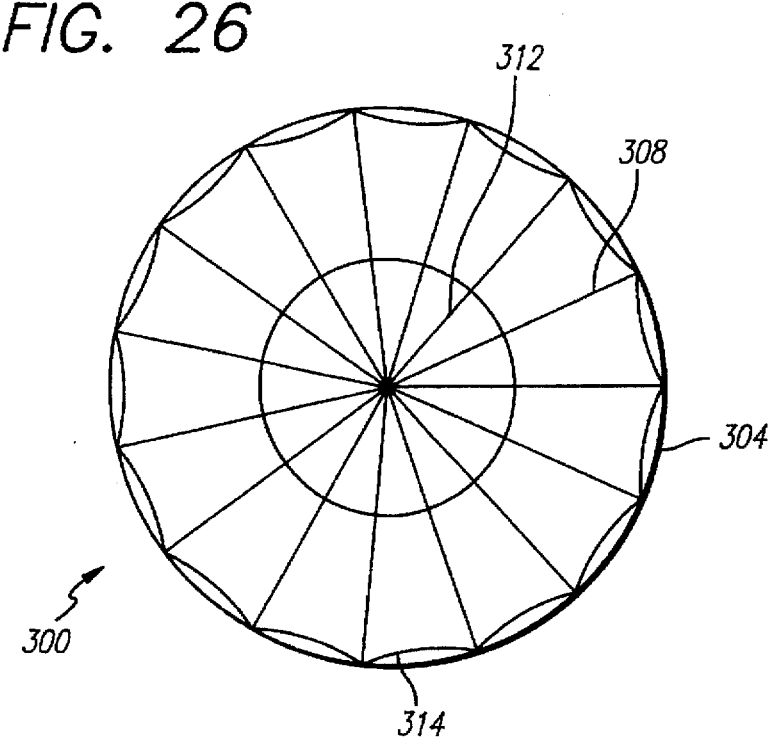
FIG. 26 is an end view of the housing associated with the embodiment shown in FIG. 25.
Figure 27:
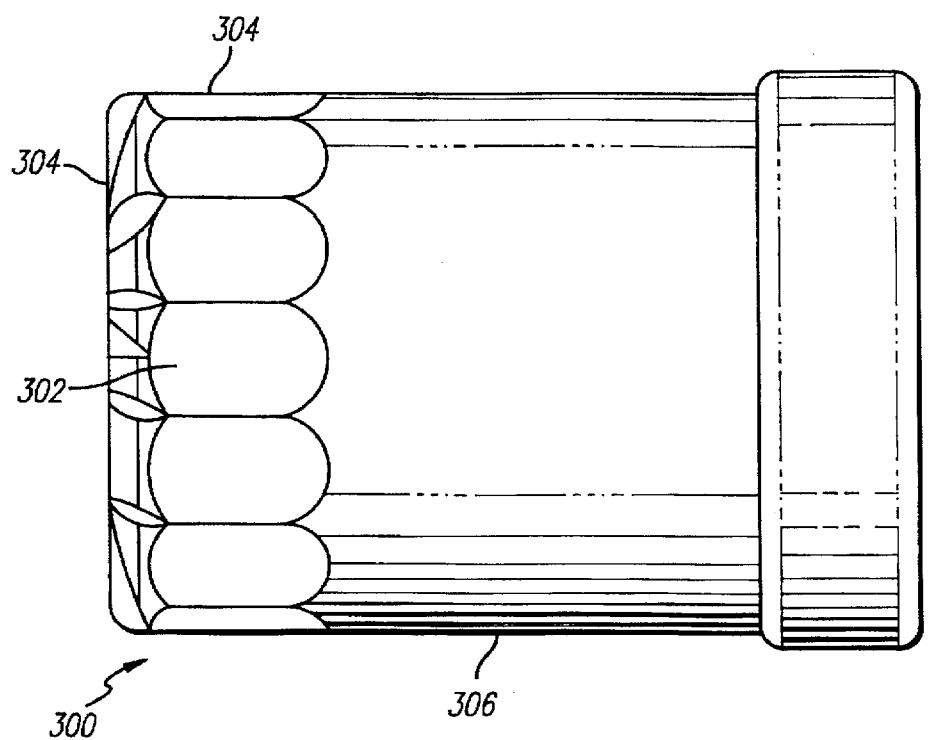
FIG. 27 is a side view of the housing associated with the embodiment shown in FIG. 25.

Furthermore, the construction of the housing 18 can be altered as illustrated in FIGS. 25–27 and described herein.

Figure 9:
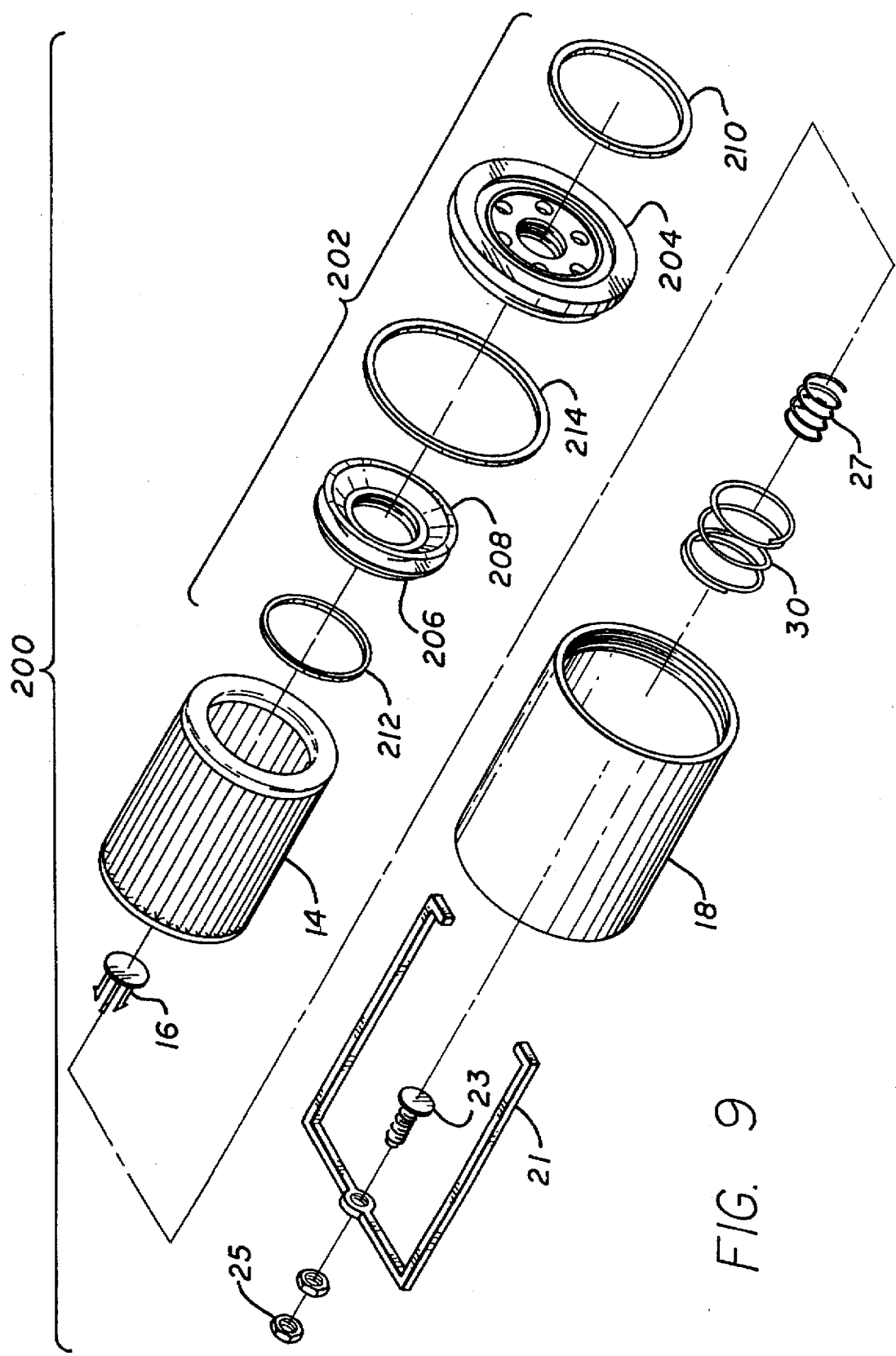
FIG. 9 is an expanded perspective view illustrating an alternative reusable filter assembly including a filter mount, filter cartridge and housing in accordance with the present invention.

Reference is now made to FIG. 9 wherein there is illustrated an alternative mounting between the engine block 37 illustrated in FIG. 2 and the filter cartridge 14. As is illustrated in FIG. 9, a filter mount 202 is shown wherein the parts of the filter mount 202 comprise a plurality of parts which are fittingly mated together rather than integrally and permanently mated together as with the adapter 12 illustrated in FIG. 1.

Referring to FIG. 9, the filter mount 202 includes a first plate 204, a second plate 206, an anti-drain back seal 208 and gaskets 210, 212 and 214. The first gasket 210 maintains the first plate 204 and the engine in sealing relationship, the second gasket 212 maintains the second plate 206 and the cartridge 14 in sealing relationship, and the third gasket 214 maintains the housing 18 and the filter mount 202 in sealing relationship. The anti-drain back seal 208 is disposed between the first plate 204 and the second plate 206 for preventing drainage of the oil back out of the engine block and drainage of oil from the filter assembly 200 back into the engine block when the engine is turned off, thus allowing the filter cartridge 14 and relief valve 16 to be easily inspected and serviced.

In accordance with an advantage of the present invention, with the filter mount 202 having parts which are fittingly mated together, rather than integrally and permanently mounted together, the anti-drain back seal 208 may be easily serviced, repaired and/or replaced. Additionally, the filter cartridge 14 and relief valve 16 may be inspected and serviced without draining the oil from the engine block. The filter mount 202 including the anti-drain back seal 208 maintains the oil in place within the engine block when the engine is turned off. In contrast, prior art anti-drain back valves are set up in reverse situations, in that they maintain the oil within the filter housing so a vacuum will not be created with the emptying of the oil back into the engine block when the engine is turned off. The present invention thus provides exactly the reverse effect of the prior art. Furthermore, as is explained in detail below, the present invention provides increased flow and less friction created by the flow of oil through the filter cartridge 14, thereby resulting in less heat in the oil.

Figure 10:
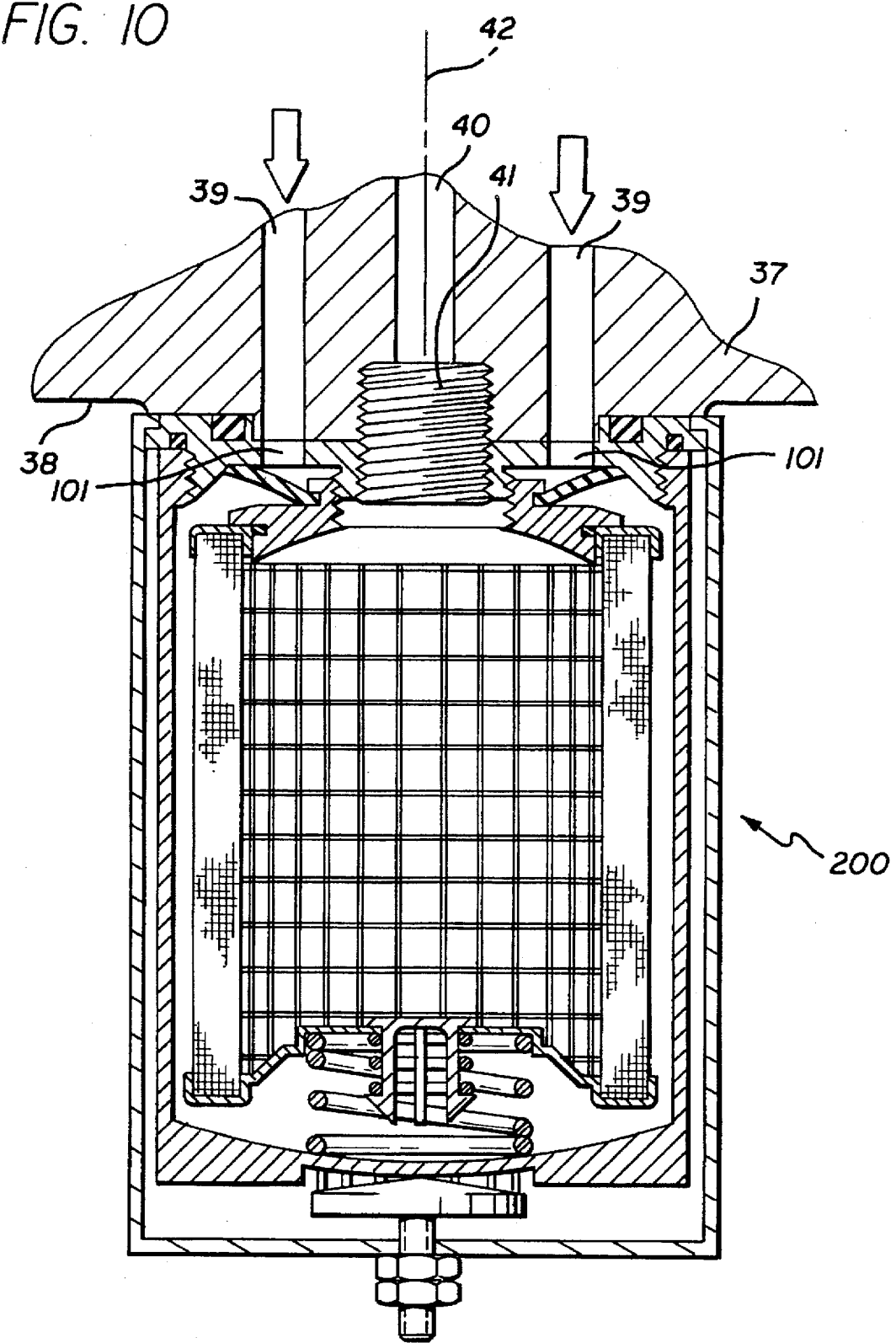
FIG. 10 is an axial cross-section view of the filter assembly shown in FIG. 9 fully assembled and attached to the block of an engine.

As is illustrated in FIG. 10, the reusable filter assembly 200 is adapted for disposition on an engine block 37, as is illustrated in FIG. 2 and previously described, having a filter base 38. The engine block 37 includes outlet passages 39 through which unfiltered oil passes to the filter assembly 200. The engine block 37 also includes an inlet passage 40 which receives filtered oil from the filter assembly 200. The inlet passage 40 typically consists of a hollow threaded post 41 which extends outwardly of the engine block 37 to engage the filter assembly 200.

Figure 11:
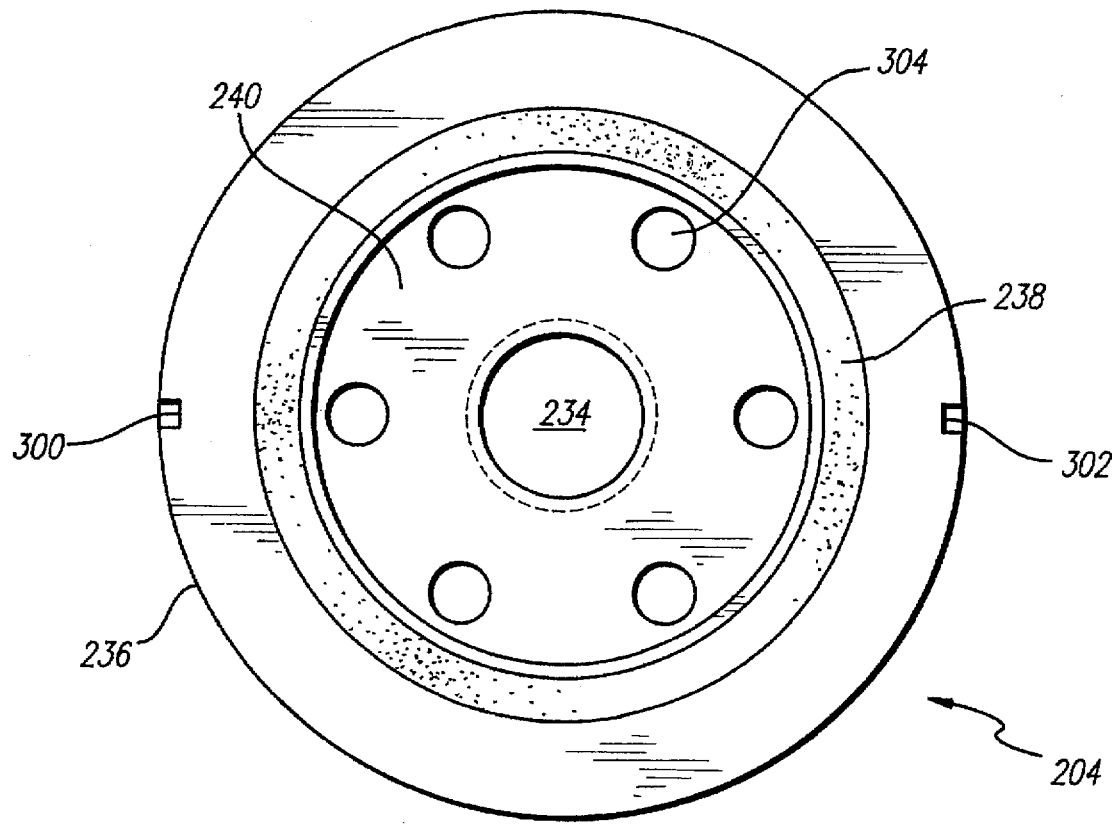
FIG. 11 is a plan view of an engine side of the first plate of the filter mount associated with the embodiment shown in FIG. 9.
Figure 12:
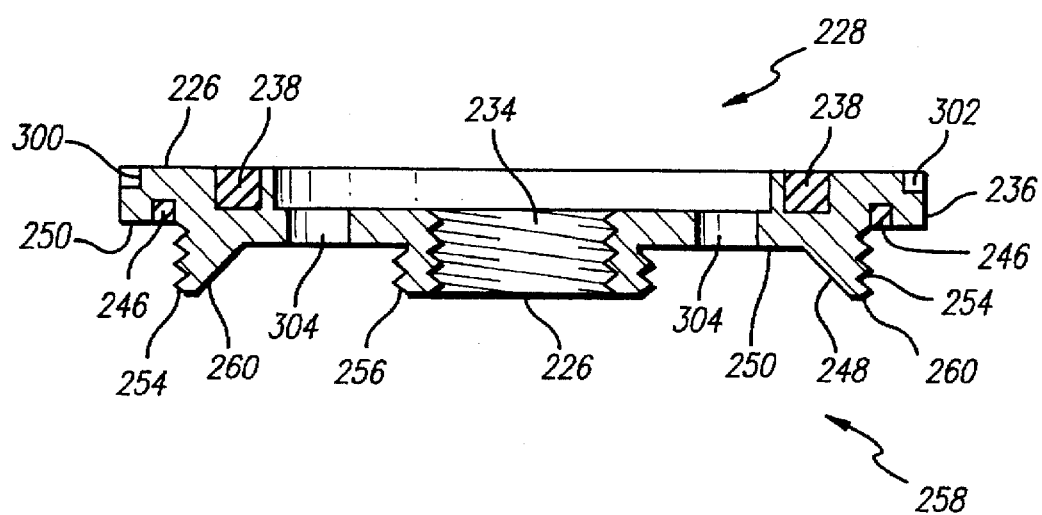
FIG. 12 is a cross-section view of the first plate of the filter mount associated with the embodiment shown in FIG. 9.
Figure 13:
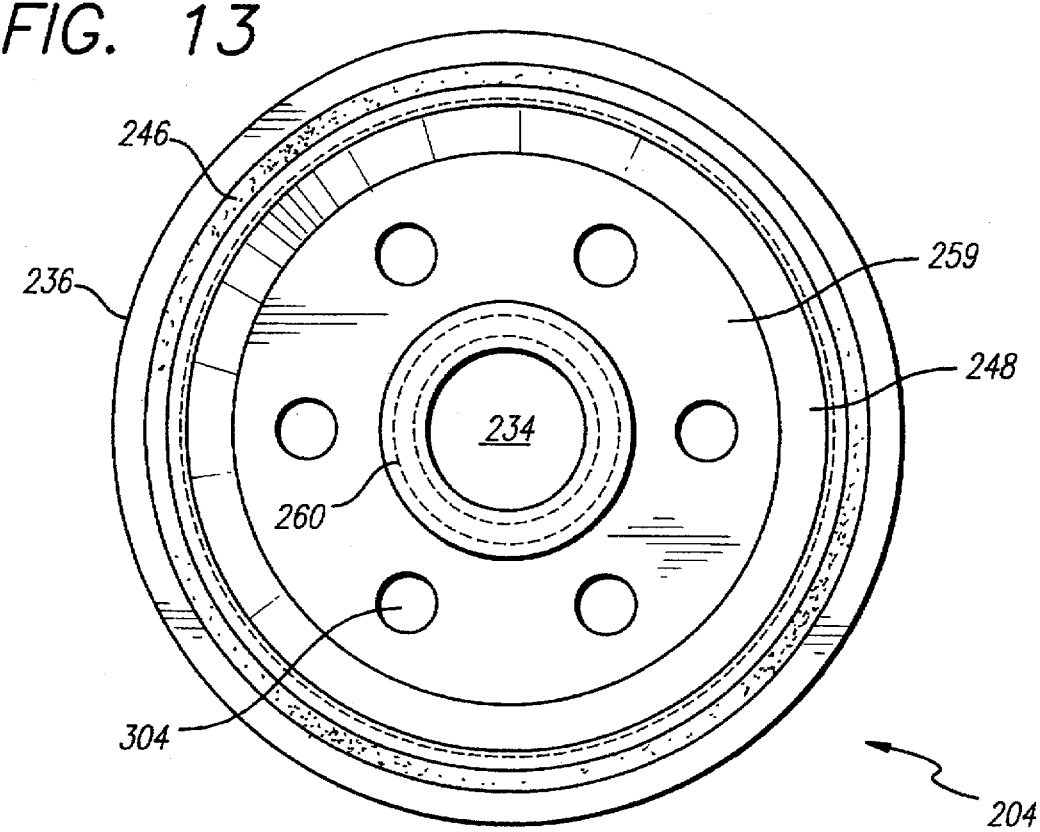
FIG. 13 is a plan view of a filter side of the first plate of the filter mount associated with the embodiment shown in FIG. 9.

The first plate 204 of the filter mount 202 is shown in greater detail in FIGS. 11-13. Referring more specifically to FIG. 11, the engine facing side 228 of the first plate 204 is shown in detail. As shown in FIGS. 11 and 12, the engine facing side 228 of the first plate 204 has an inside diameter 234 and an outside diameter 236. A first annular groove 238 is formed in the surface 226 to receive the gasket 210. A annular portion 240 is disposed inwardly of, and concentric with, the first annular groove 238. This annular portion 240 is positioned to mate universally with the outlet passages 39 associated with the filter base 38 of the engine block 37. Thus the unfiltered oil in the outlet passages 39 first touches the filter mount 202 at the annular portion 240. The inside diameter 234 of the first plate 204 is threaded to mate with the hollow threaded post 41 extending from the engine block 37 at the filter base 38. Of particular importance to the flow of unfiltered oil, are a plurality of inlet passages 304 which, in a preferred embodiment, extend axially from the annular groove 240 and radially outwardly through the first plate 204. Thus the unfiltered oil from the outlet passages 39 of the engine block 37 is first introduced to the annular groove 240 and then directed through the multiple inlet passages 304 of the first plate 204. In the passages 304, the oil flows axially and then outwardly to exit the first plate 204 at the anti-drain back seal facing side 258 of the first plate 204. In order to facilitate attachment of the bale 21 to the filter mount 202, a pair of circumferential recesses 300, 302 can be formed in the radial surface 226 at diametrically opposed positions.

Referring more specifically to FIG. 13, the anti-drain back seal facing side 258 of the first plate 204 is shown in detail. As shown in FIGS. 12 and 13, the anti-drain back seal facing side 258 of the first plate 204 has an inside diameter 234 and an outside diameter 236. An annular groove 246 is formed in the surface 250 to receive the gasket 214. An outer surface 254, extending axially from the radial surface 250 to the radial surface 260, is threaded to receive the housing 18. An inner surface 256 extends axially from the radial surface 250 to the radial surface 260 and is threaded to receive the second plate 206. An annular projection 248 extends outwardly from the radial surface 250 to the radial surface 260. The plurality of inlet passages 304 extend axially through the anti-drain back seal facing side 258 of the first plate 204.

Figure 14:
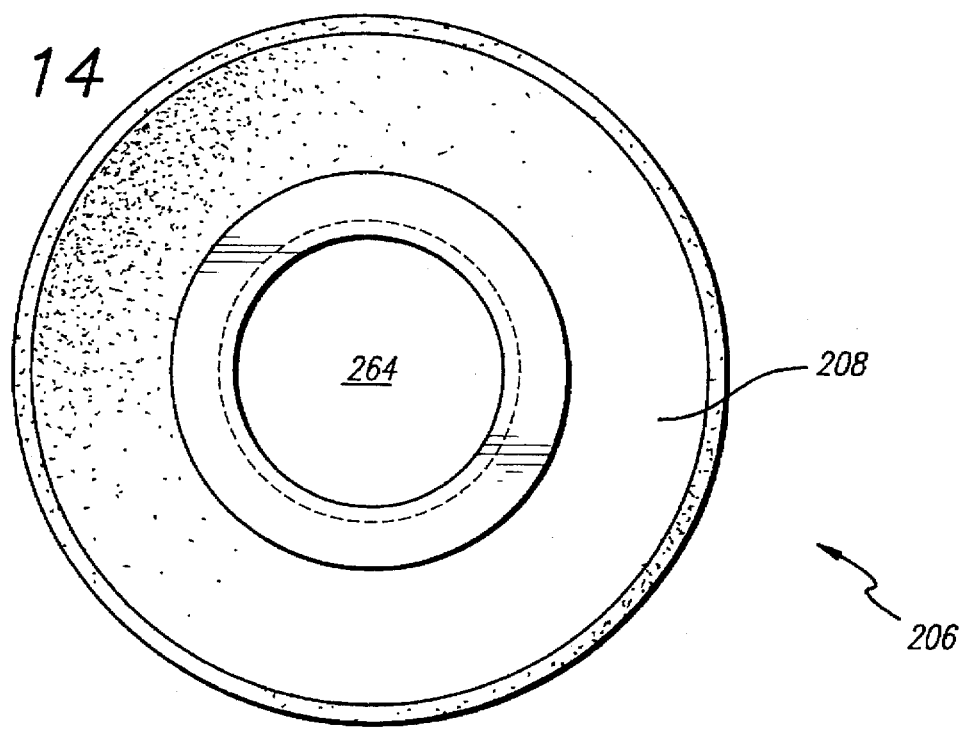
FIG. 14 is a plan view of an engine side of the second plate of the filter mount associated with the embodiment shown in FIG. 9.
Figure 15:
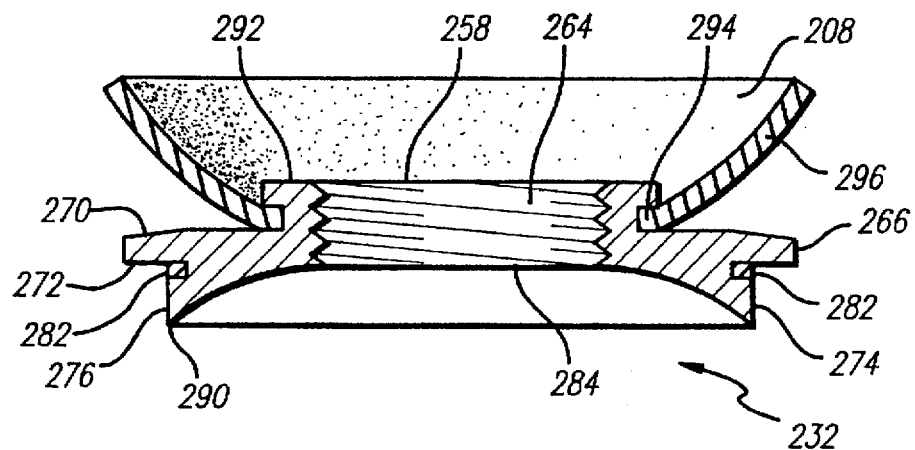
FIG. 15 is a cross-section view of the second plate of the filter mount associated with the embodiment shown in FIG. 9.
Figure 16:
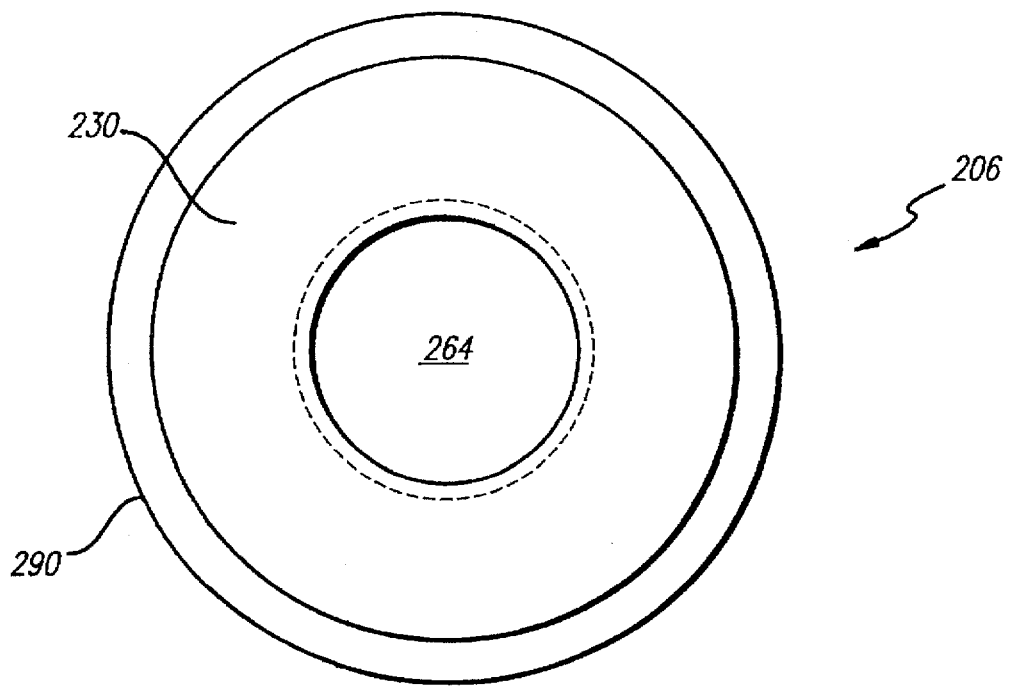
FIG. 16 is a plan view of a filter side of the second plate of the filter mount associated with the embodiment shown in FIG. 9.

The second plate 206 including the anti-drain back seal 208 mounted therein is shown in greater detail in FIGS. 14-16. Referring more specifically to FIG. 14, the first plate facing side 258 of the second plate 206 is shown in detail. As shown in FIGS. 14 and 15, the first plate facing side 258 of the second plate 206 has an inside diameter 264 and an outside diameter 266. A cylindrical surface 296 extends axially from the radial surface 270 to the radial surface 292. A radial recess 294 is provided in the cylindrical surface 296 along the radial surface 270. This recess 294 is sized and configured to receive the anti-drain back seal 208, illustrated in FIGS. 17 and 18 and described in detail below. In the axial direction, the second plate 206 extends from the radial surface 270 to a radial surface 272.

Referring more specifically to FIG. 16, the filter facing side 232 of the second plate 206 is shown in detail. As shown in FIGS. 15 and 16, the filter facing side 232 of the second plate 206 has an inside diameter 264 and an outside diameter 266. An inner surface 276 extends axially from the radial surface 272 to the radial periphery 290, thus forming a shoulder 274 on the filter facing side 232 of the second plate 206. A radial recess 282 is provided in the inner surface 276 along the radial surface 272. This radial recess 282 is sized and configured to receive the gasket 212 for maintaining the second plate 206 and the cartridge 14 in sealing relationship. A central portion 284 extends generally radially and axially outwardly from the periphery of the inner diameter 264 to the radial periphery 290 in sealing engagement with the filter cartridge 14.

Figure 17:
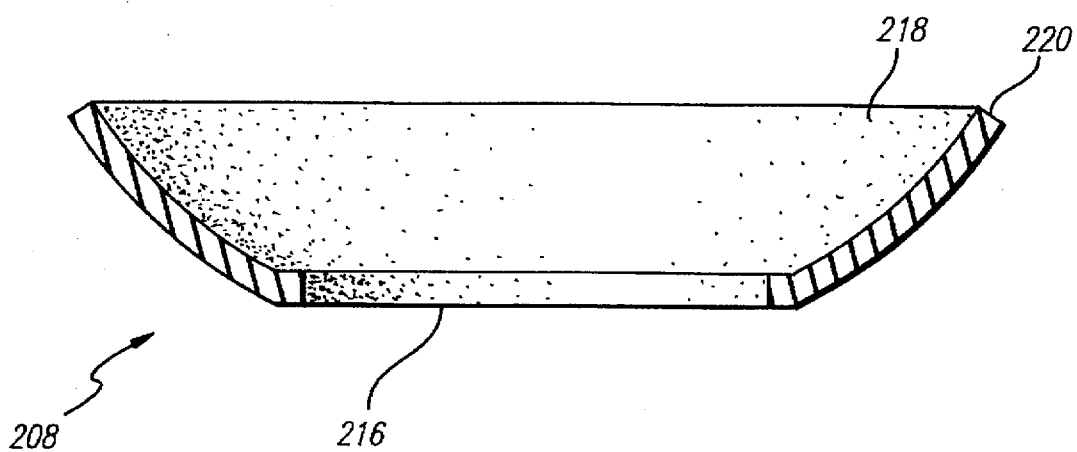
FIG. 17 is a cross-section view of the anti-drain back seal of the filter mount associated with the embodiment shown in FIG. 9.
Figure 18:
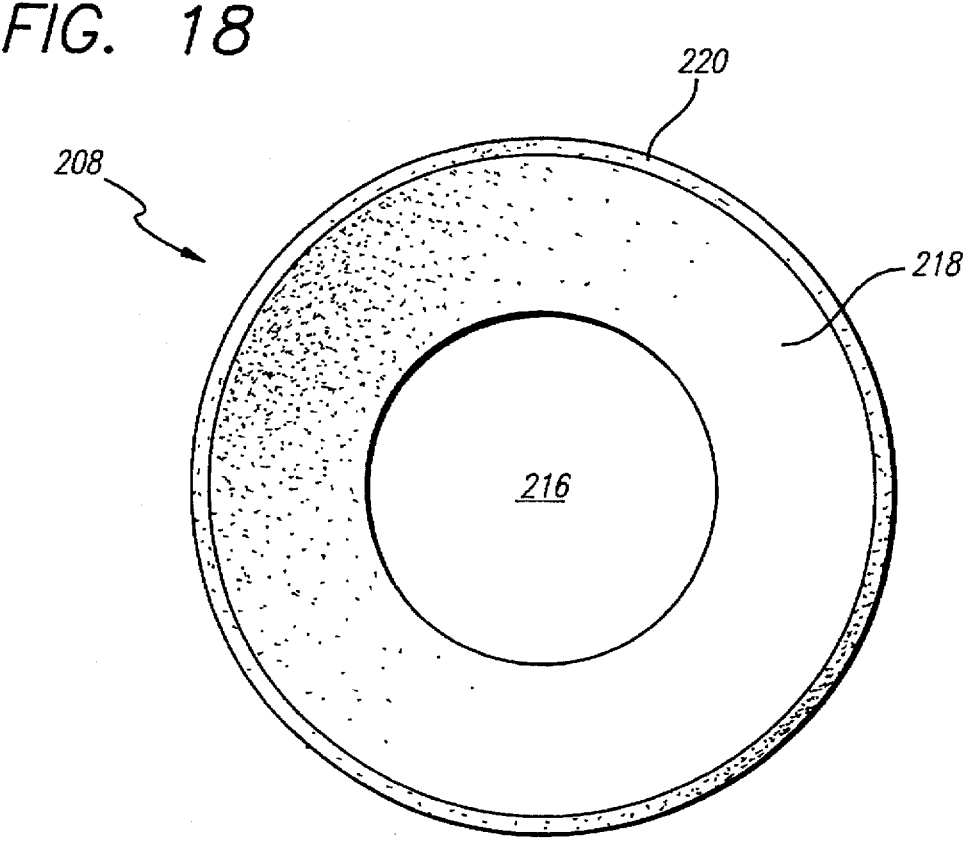
FIG. 18 is a plan view of an engine side of the anti-drain back seal of the filter mount associated with the embodiment shown in FIG. 9.
Figure 19:
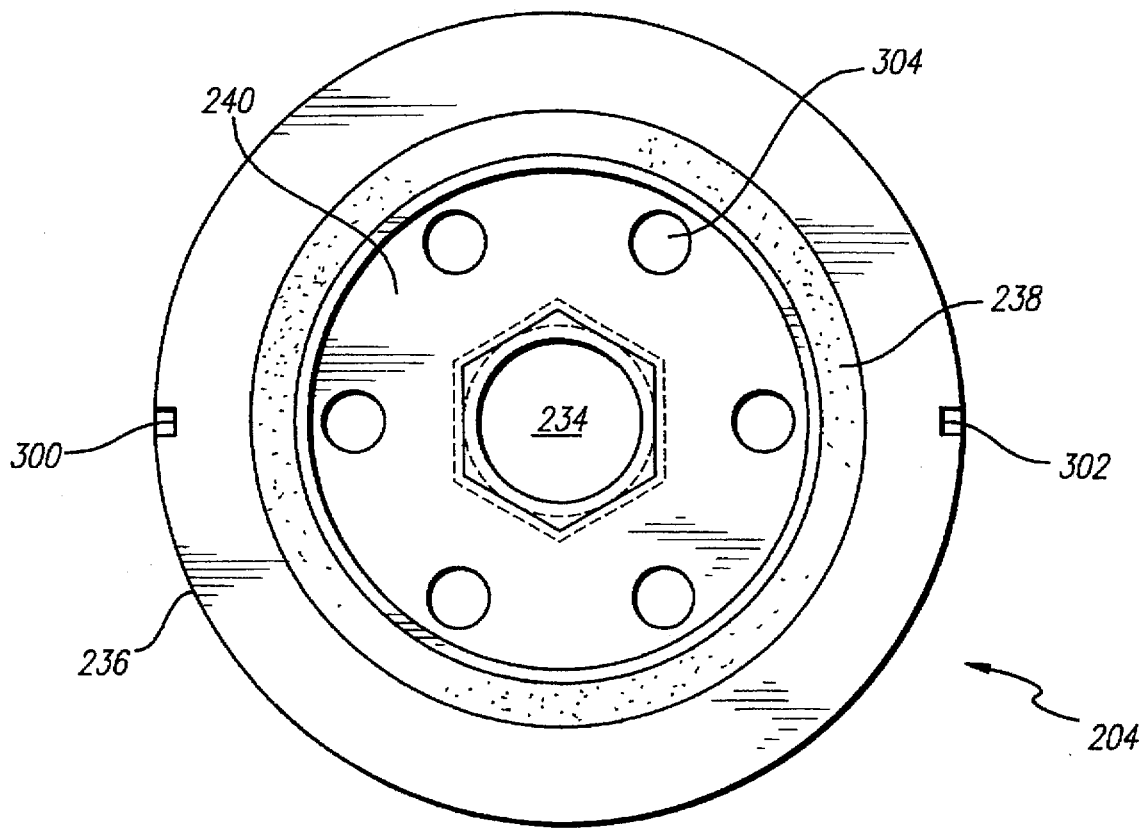
FIG. 19 is a plan view of an engine side of another alternative first plate of the filter mount in accordance with the present invention.
Figure 20:
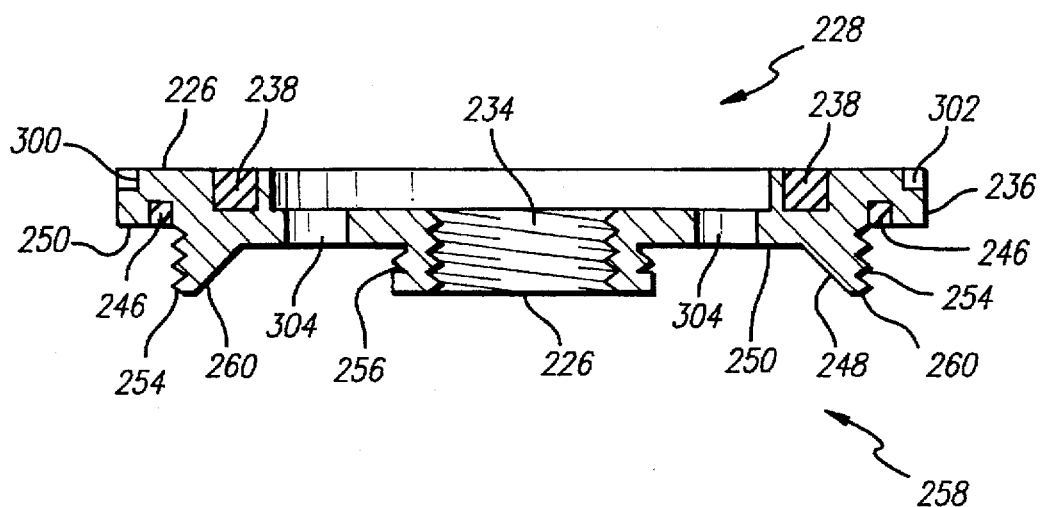
FIG. 20 is a cross-section view of the first plate of the filter mount associated with the embodiment shown in FIG. 19.
Figure 21:
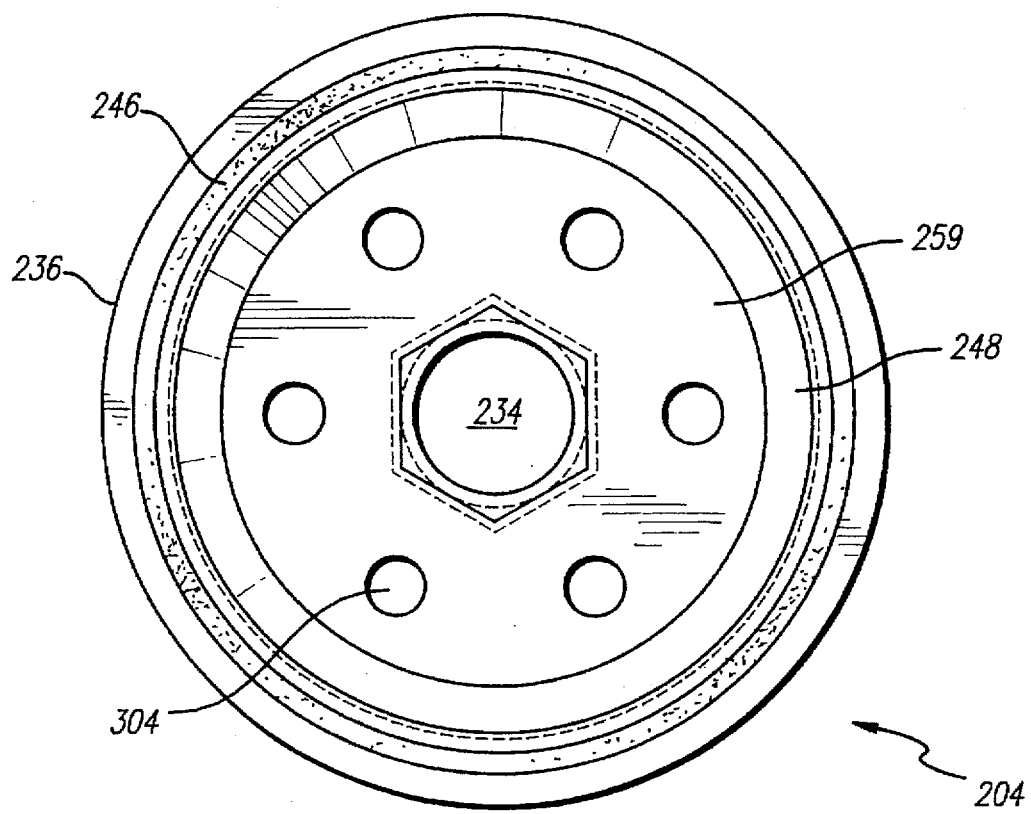
FIG. 21 is a plan view of a filter side of the first plate of the filter mount associated with the embodiment shown in FIG. 19.
Figure 22:
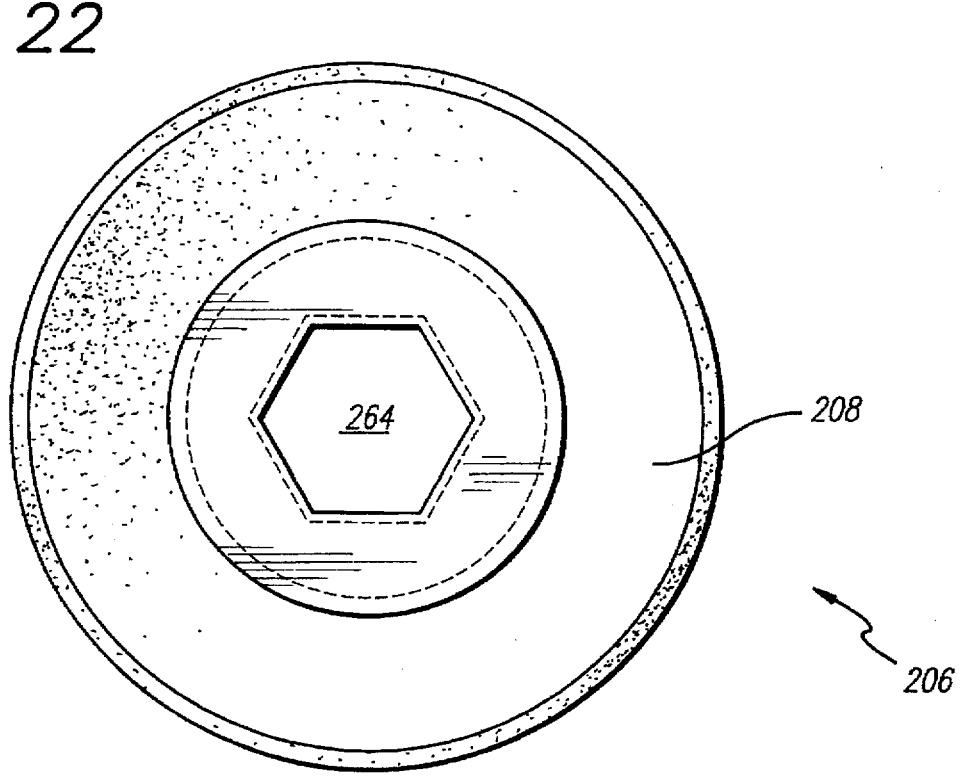
FIG. 22 is a plan view of an engine side of the second plate of the filter mount associated with the embodiment shown in FIG. 19.
Figure 23:
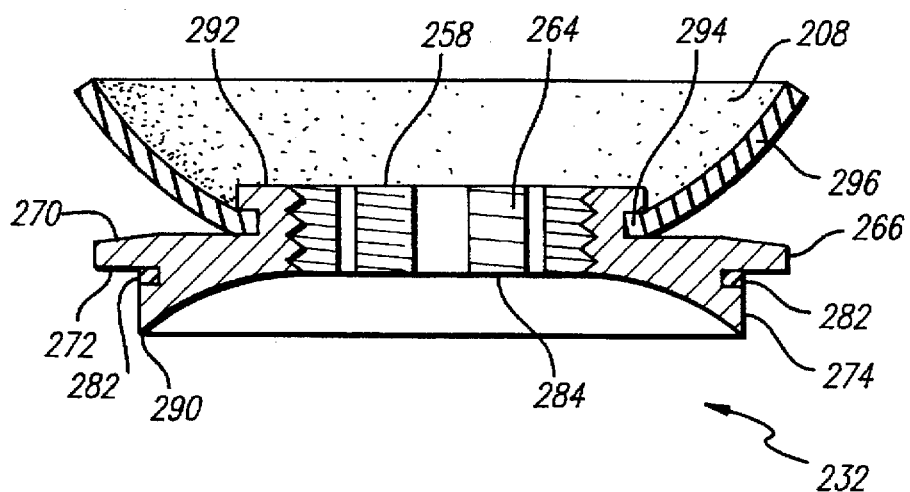
FIG. 23 is a cross-section view of the second plate of the filter mount associated with the embodiment shown in FIG. 19.
Figure 24:
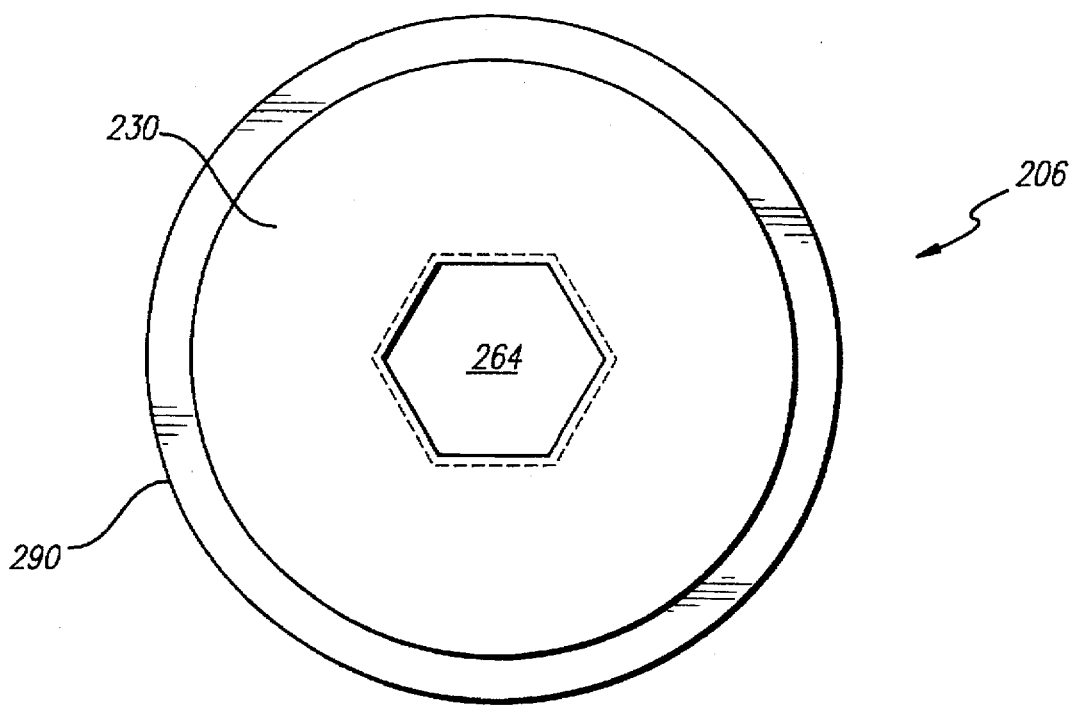
FIG. 24 is a plan view of a filter side of the second plate of the filter mount associated with the embodiment shown in FIG. 19.

As is shown in detail in FIGS. 17 and 18, the anti-drain back seal 208 includes a central aperture 216 from which a first portion 218 extends generally radially and axially outwardly to a periphery 220. When installed in the filter 200, the periphery 220 of the anti-drain back seal 208 sealingly engages the anti-drain back seal facing surface 258 of the first plate 204. When engaged in this position, the anti-drain back seal 208 prevents oil from flowing back out of the engine and drainage of oil from the filter assembly back into the engine when the engine is turned off. When the engine is operating, the pressure of the oil from the engine lifts the peripheral portion 220 of the anti-drain back seal 208 away from the anti-drain back seal facing surface 258 of the first plate 204, thereby permitting the oil to pass to the filter cartridge 14. The anti-drain back seal 208 is manufactured preferably from rubber, although other resistant material including but not limited to fluorocarbon elastomers may be used as well.

Referring back to FIG. 10, one can appreciate the ease of assembly associated with the various elements of the filter assembly 200. Initially the filter mount 202 is screwed onto the hollow threaded post 41 to form a seal at the gasket 210 between the engine block 37 and the filter mount 202. This aligns the filter mount 202 to receive unfiltered oil in the passages 304 and to return filtered oil through the central passage 234 of the filter mount 202 and the hollow threaded post 41 of the engine block 37.

With the filter mount 202 in place, the filter cartridge 14 can then be mounted with its open first end 115 engaging the shoulder 274 on the filter facing side 232 of the second plate 206. In this position, the first closure cap 134 seats with its central section 136 in contact with the radial surface 272, and the inner flange 138 forms a seal with the gasket 212 disposed in the radial recess 282.

It is desirable that the filter cartridge 14 be force fit onto the filter facing side 232 of the second plate 206 so that it can support itself as the housing 18 is brought into position. This force fit can be enhanced by close tolerances between the inner flange 138 and the cylindrical surface 276. Alternatively, the inner flange 138 can be formed to extend slightly radially inwardly as it extends from the central section 136. This configuration forces the shoulder 74 to bend the inner flange 138 into axial alignment as it is force fit onto the shoulder 274 of the second plate 206.

With the filter cartridge 14 operatively positioned, the housing 18 can then be placed over the filter cartridge 14 and seated against the filter mount 202. This seating is facilitated by the gasket 214 which is disposed in the annular groove 246 of the first plate 204 of the filter mount 202. The housing 18 can also be formed with a threaded annulus 185 which facilitates screwing the housing 18 into the threaded surface of the annular groove 246. As the housing 18 is brought into sealing engagement with the filter mount 202, the spring 30 is forced by the closed end of the housing 18 to exert a pressure on the closed second end 116 of the filter cartridge 14. This feature maintains the filter cartridge 14 in its preferred position against the gasket 212 of the second plate 206, and enhances the sealing engagement of the cartridge 14 with the filter mount 202.

In some embodiments of the filter assembly 200 which are adapted for use with vehicles having a relatively high oil pressure, additional support may be desired in order to maintain the housing 18 in position. In the illustrated embodiment, this support is provided by the bale 21 which can be formed with a pair of radially extending pins 187 and 190 which mate with the circumferential recesses 300 and 302, respectively, of the filter mount 202. In this manner, the bale 21 can be held in a pivotal relationship with the filter mount 202. At the opposite end of the bale 21, the set screw 23 can be turned within a fixed nut 192, to create an axial force against the housing 18. When the proper force is generated, the lock nut 25 can be tightened to maintain the axial position of the set screw 23.

In operation, unfiltered oil emanates from the outlet passages 39 of the engine block 37 and into the inlet passages 304 associated with the filter mount 202. This unfiltered oil passes into the region defined outwardly by the housing 18 and inwardly by the filter cartridge 14. Due to the presence of the closure caps 134 and 152, and the seal provided by the gasket 212, the fluid pressure forces the oil through the pleats 112 of the filter element 110. The filtered oil then passes into the central passage 132 and through the filter mount 202 into the hollow post 41 of the engine block 37.

There are many variations on the foregoing concept associated with this invention. For example, as is illustrated in FIGS. 19–24, the construction of the filter mount 202 can be altered to provide other forms of a universal filter mount on the engine block 37, and to provide for a flow of the unfiltered oil into the housing 18. For example, the generally circular central portion 284 extending generally radially and axially outwardly from the periphery of the inside diameter 264 to the radial periphery 290 on the filter facing side 232 of the second plate 206 could be configured hexagonally, rather than circularly, for engagement with the filter cartridge 14. In particular, the first plate 204 of the filter mount 202 including the hexagonal central portion 234 is shown in detail in FIGS. 19–21. The second plate 206 including the hexagonal central portion 264 is shown in detail in FIGS. 22–24. In such a hexagonal configuration, the second filter facing plate 206 could be pushed in, screwed and locked to the first filter facing plate 204. Other means could also be provided to form the necessary seals between the filter mount 202 and each of the filter base 38, housing 18, and filter cartridge 14. Different materials can also be used for various components in the filter assembly 200. For example, any of the components (other than the gaskets 210, 212 and 214) may be made from metal such as aluminum or steel. In addition the filter mount 202, the housing 18, and the relief valve 16 can be made from plastic.

Reference is now made to FIGS. 25–27 wherein there is illustrated an alternative filter housing 300 for housing a filter assembly, such as that shown in FIG. 9, constructed in accordance with the principles of the present invention. For illustrative purposes, the present invention is illustrated and described herein using the filter assembly 200 shown in FIG. 9. The present invention is not limited, however, to the filter assembly 200 shown in FIG. 9, but rather may be used with both conventional and specially designed oil filters, including the filter assembly 10 shown in FIG. 1. As is illustrated in FIG. 25, the filter housing 300 includes a plurality of facets 302 preferably spaced equally about one end 304 of the body portion 306 of the housing 300 for facilitating removal of the filter housing 300 from the filter assembly 200. The facets 302 are preferably configured such that a conventional clamp (not shown) could attach around the portion of the housing 300 including the facets 302 to unlock the housing 300 from the filter assembly 200.

Additionally, as is illustrated in detail in FIG. 27, a plurality of ribs or fins 308 are disposed on the end portion 310 of the filter housing 300 to facilitate cooling of the oil and to provide additional strength and reinforcement to the housing 300 thereby protecting it against debris and other harmful elements. The ribs 308 extend from the center 312 of the end portion 310 to the periphery 314 of the end portion 310. Those skilled in the art will readily recognize that the dimensions of the facets 302 and ribs 308 will vary depending on various factors, including but not limited to the dimensions of the housing 300 and the amount of oil being filtered. It will be appreciated by persons skilled in the art that the present invention is not limited to what has been shown and described hereinabove, nor the dimensions of sizes of the physical implementation described immediately above. The scope of the invention is limited solely by the claims which follow.

What is claimed is:

1. A reusable oil filter assembly adapted for use in filtering said lubricating oil of an engine configured to receive an oil filter, said assembly comprising:

a filter housing having an open end and a closed end;

inlet means for receiving unfiltered oil from said engine;

outlet means for returning filtered oil to said engine;

a filter mount, disposed between said filter housing and said engine, for receiving said unfiltered oil through said inlet means from said engine and returning filtered oil through said outlet means to said engine, wherein said filter mount further comprises:

a first plate;

a second plate; and an anti-drain back seal disposed between said first plate and said second plate for preventing drainage of said oil back out of said engine and drainage of oil from said filter assembly back into said engine when said engine is turned off, wherein said first plate further comprises an engine facing side and an anti-drain back seal facing side, said anti-drain back seal facing side further comprising a first surface of said first plate threaded for receiving a corresponding threading on said second plate, and wherein said first plate, said second plate and said anti-drain back seal are fittingly mated together, thus facilitating service, repair and replacement of said assembly, mounting means for removably mounting said filter housing on said filter mount, wherein said mounting means includes a threaded second surface on said first plate for threadedly receiving a threaded surface on said housing with said open end of said housing in sealing engagement with said filter mount to form a filter chamber between said housing and said filter side of said filter mount, a filter cartridge sized and configured to register with said filter mount inside said filter chamber, said filter cartridge having a generally cylindrical configuration and being positioned relative to said filter mount to receive said unfiltered oil from regions exterior of said filter cartridge and to return said filtered oil from regions interior of said filter cartridge;

a filter element included in said filter cartridge and having said general configuration of a cylinder with a first end and a second opposing end;

means disposed on a first end of said filter cartridge for forming a seal between said filter element and said filter mount;

a closure cap included in said filter cartridge and disposed at said second end of said filter element said closure cap defining an opening extending between said regions interior of said filter cartridge and said regions exterior of said filter cartridge;

a relief valve permanently attached to said closure cap, said relief valve including a valve element movable between a first position inhibiting said flow of said oil through said opening and a second position permitting a flow of said oil through said opening when said filter is clogged;

means disposed in said regions exterior of said filter cartridge for biasing said relief valve to said first position; and a bale pivotally connected to said filter mount and extending outwardly of said housing to engage said closed end of said housing and to lock said housing in sealing engagement with said filter mount at said open end of said housing.

2. The resusable oil filter assembly claimed in claim 1, wherein said engine facing side of said first plate comprises:

a first annular groove for receiving a first sealing means; and an annular portion disposed radially inwardly of and concentric with said first annular groove;

wherein said inlet means comprises a plurality of inlet passages disposed through said annular portion for receiving unfiltered oil from said engine.

3. The reusable oil filter assembly claimed in claim 2, wherein said anti-drain back seal facing side of said first plate further comprises:

a third annular groove for receiving a second sealing means.

4. The reusable oil filter assembly claimed in claim 3, wherein said second plate includes a first plate facing side and a filter facing side, comprising:

a first groove disposed on said first plate facing side for receiving and retaining said anti-drain back seal.

5. The reusable oil filter assembly claimed in claim 4, wherein said means for forming a seal between said filter element and said filter mount comprises:

a second groove disposed on the filter facing side of said second plate for receiving a third sealing means for maintaining said second plate and said cartridge in sealing relationship;

a central portion disposed on a portion the filter facing side of said second plate extending generally outwardly from said filter facing side for sealing engagement with said filter cartridge.

6. The reusable oil filter assembly claimed in claim 5, wherein said anti-drain back seal comprises:

a central aperture from which a first portion extends generally radially and axially outwardly to a periphery, such that when installed in said filter, said periphery of said anti-drain back seal sealingly engages said anti-drain back seal facing side of said first plate thereby preventing both oil from flowing out of said engine and into said assembly and oil flowing out of said assembly and into said engine when said engine is turned off, wherein an outer perimeter of said central aperture engages said first groove disposed on said second plate.

7. The reusable oil filter assembly claimed in claim 6, wherein when said engine is operating, oil pressure from said engine lifts said periphery of said anti-drain back seal away from said anti-drain back seal facing surface of said first plate, thereby permitting said oil to pass to said filter cartridge.

8. The reusable oil filter assembly claimed in claim 7, wherein said anti-drain back seal is manufactured from rubber.

9. The reusable oil filter assembly claimed in claim 7, wherein said anti-drain back seal is manufactured from fluorocarbon elastomers.

10. The reusable oil filter assembly claimed in claim 7, wherein said filter housing further comprises:

a plurality of ribs disposed on the closed end of said filter housing for facilitating cooling of said oil and for providing additional strength and reinforcement to said housing thereby protecting it against debris and other harmful elements.

11. The reusable oil filter assembly claimed in claim 10, wherein said ribs extend from a center of said closed end to a periphery of said closed end.

12. The reusable oil filter assembly claimed in claim 11, wherein said filter housing further comprises:

a body portion having one end adjacent said closed end; and a plurality of facets spaced equally about said one end of the body portion of said housing for facilitating removal of said filter housing form said assembly.

13. The reusable oil filter assembly claimed in claim 12, wherein said relief valve element comprises:

a septum disposed within said regions interior of said filter cartridge, at least one shaft coupled to said septum and extending through said opening from said regions interior of said cartridge to said regions exterior of said cartridge, and a barb formed on said shaft in said regions exterior of said filter cartridge; and said biasing means comprising a compression spring disposed in said regions exterior of said filter cartridge between said closure cap and said barb of said relief valve element for biasing said septum into sealing engagement with said closure cap in said regions interior of said filter cartridge.

14. The reusable oil filter assembly claimed in claim 13, further comprising:

means disposed between said closed end of said housing and said closure cap of said filter cartridge for biasing said filter cartridge at said second end of said filter cartridge into sealing engagement with said filter mount at said first end of said filter cartridge.

\* \* \* \* \*